Figure 1:
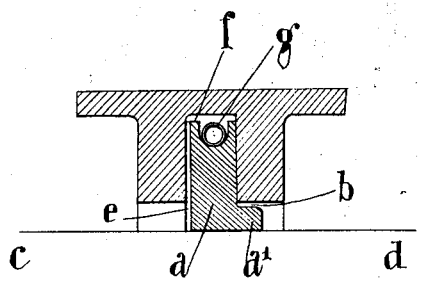

C. A. PARSONS, S. S. COOK AND L. M. DOUGLAS.
CARBON GLAND.
APPLICATION FILED JULY 19, 1919.

1,338,955. Patented May 4, 1920.

INVENTOR
Charles A. Parsons
BY Stanley S. Cook
Louis M. Douglas
Spear, Middleton, Donaldson & Spear ATTORNEYS

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

CARBON-GLAND.

1,338,955.  Specification of Letters Patent.  Patented May 4, 1920.

Application filed July 19, 1919. Serial No. 312,053.

*To all whom it may concern:*

Be it known that we, CHARLES ALGERNON PARSONS, K. C. B., STANLEY SMITH COOK, and LOUIS MORTIMER DOUGLAS, all subjects of the King of Great Britain and Ireland, and all residing at Heaton Works, Newcastle-upon-Tyne, in the county of Northumberland, England, have invented certain new and useful Improvements in Carbon-Glands, of which the following is a specification.

This invention relates to carbon glands for packing rotating shafts and has for its object to produce a carbon gland-ring capable of sustaining higher pressures than have been hitherto carried and having greatly reduced friction while being more reliable than has hitherto been the case with such gland-rings.

The invention is more particularly concerned with the type of gland-ring described in our copending application No. 257,080, from which this is a divisional application.

Carbon glands as heretofore designed consist of rings, each ring being made up of sectors of graphitic carbon usually of rectangular cross section, embracing the rotating shafts and held together by a spring encircling them, the purpose of such carbon gland-ring being to baffle the flow of steam from a higher pressure on one side of it to a lower pressure on the other. The outer periphery of the gland-ring is in such case subjected over its whole area to the higher pressure, while its inner periphery, which is in contact with or is bored to fit the surface of the shaft, is subject to a lower average pressure owing to the fall of pressure from the high pressure side to the low pressure side. It follows, therefore, that there is a radial inward force on the ring pressing it toward the shaft, thus giving rise to friction, absorbing power and producing a corresponding amount of heat.

The present invention consists broadly in constructing gland-rings in such a manner that they are substantially in radial equilibrium under the steam pressure.

The invention further consists in forming the gland-rings of L shape with the extension along the shaft toward the low pressure side, a space being provided between the back of the extended portion and the housing of the gland-ring, which space is exposed to the lower pressure.

The invention still further consists in divided gland-rings of L shape having on the high pressure side projections to prevent tilting of the segments while allowing passage of steam to the space around the outer periphery of the ring.

The invention also consists in the improved carbon glands hereinafter described.

In the accompanying drawing, Figure 1 is a section of a gland taken on a plane which passes through the axis of the shaft.

Figure 2:
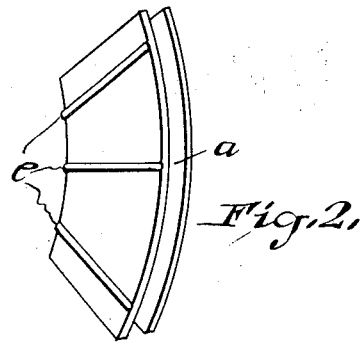

Fig. 2 is a view in perspective of one of the ring segments.

In carrying the invention into effect according to the example illustrated, the gland is made up of a number of L shaped segments $a$ with extensions $a'$ lying along the shaft toward the low pressure side. A space $b$ is allowed between the housing of the gland and the back of the extended portion of each carbon sector, and this space is exposed to the low pressure. In this manner while retaining the same width of ring (in an axial direction) as would normally exist in an ordinary ring of rectangular section the inward pressure of the steam on the gland-ring may be made substantially equal to the outward pressure, there being high pressure over the periphery of the gland-ring on the high pressure side and low pressure over the back of the extension on the low-pressure side, these two pressures acting against the outward radial pressure which varies along the shaft from the higher to the lower value. The rotating shaft is shown at $c$ $d$, and $c$ is the high pressure and $d$ the low pressure end.

Projections $e$ are provided on the high pressure side of each segment to prevent tilting, these projections having spaces between them to allow steam to pass freely to the space $f$ around the outer periphery of the ring.

By means of the invention the rings are substantially in equilibrium in the radial direction under the steam pressure so that friction against the shaft is reduced and higher steam pressures across the gland-rings can be allowed.

In consequence of the reduced friction and reduced heating a more reliable gland is obtained.

It is usually preferable to leave a slight balance of pressure in the inward radial direction to assist the encircling spring $g$ in keeping the carbon sectors in place. This spring may be placed either around the outer periphery of the ring or around the periphery of the extended portion of the ring.

The use of an encircling spring is not essential as the carbon rings may be held together by any other suitable means.

Having now described our invention, what we claim as new and desire to secure by Letters Patent is:—

In carbon and like glands for rotating shafts comprising packing rings divided into segments each with an extension projecting toward the low pressure end of the shaft, providing on the high pressure side of the ring projections to prevent tilting of the segments and intervening spaces to allow passage of steam to the space around the outer periphery of the ring.

In testimony whereof we have signed our names to this specification.

CHARLES ALGERNON PARSONS.
STANLEY SMITH COOK.
LOUIS MORTIMER DOUGLAS.